(12) United States Patent
Hsiao

(10) Patent No.: US 8,219,167 B2
(45) Date of Patent: Jul. 10, 2012

(54) PROTECTIVE ENVELOPE AND RELATED PORTABLE ELECTRONIC DEVICE COMBINATION

(75) Inventor: Bor-Yuan Hsiao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 878 days.

(21) Appl. No.: 12/274,496

(22) Filed: Nov. 20, 2008

(65) Prior Publication Data

US 2009/0286581 A1  Nov. 19, 2009

(30) Foreign Application Priority Data

May 15, 2008  (CN) .......................... 2008 1 0301591

(51) Int. Cl.
*H04M 1/00* (2006.01)
(52) U.S. Cl. ................... 455/575.8; 455/575.1; 220/694
(58) Field of Classification Search ............... 455/575.8, 455/575.1; 220/694
See application file for complete search history.

(56) References Cited

U.S. PATENT DOCUMENTS

| 5,002,184 | A | * | 3/1991 | Lloyd | 206/305 |
| 5,383,091 | A | * | 1/1995 | Snell | 361/679.01 |
| 6,003,052 | A | * | 12/1999 | Yamagata | 708/100 |
| 6,092,707 | A | * | 7/2000 | Bowes, Jr. | 224/435 |
| 6,983,130 | B2 | * | 1/2006 | Chien et al. | 455/90.3 |
| 7,072,699 | B2 | * | 7/2006 | Eiden | 455/575.8 |
| 7,400,917 | B2 | * | 7/2008 | Wood et al. | 455/575.8 |
| 2004/0166910 | A1 | * | 8/2004 | Ha et al. | 455/575.8 |
| 2005/0181745 | A1 | * | 8/2005 | Wood et al. | 455/90.3 |
| 2006/0052064 | A1 | * | 3/2006 | Goradesky | 455/90.3 |
| 2008/0132289 | A1 | * | 6/2008 | Wood et al. | 455/566 |
| 2009/0017883 | A1 | * | 1/2009 | Lin | 455/575.8 |
| 2009/0312058 | A9 | * | 12/2009 | Wood et al. | 455/566 |
| 2011/0098090 | A1 | * | 4/2011 | Parienti et al. | 455/566 |

* cited by examiner

*Primary Examiner* — Yuwen Pan
(74) *Attorney, Agent, or Firm* — Altis Law Group, Inc.

(57) ABSTRACT

An exemplary protective envelope for a portable electronic device includes a hollow main body and a cleaning roller arranged in the hollow main body. The hollow main body defines therein an opening for insertion of the portable electronic device therethrough. The cleaning roller is rotatably fixed in the hollow main body.

9 Claims, 2 Drawing Sheets

PROTECTIVE ENVELOPE AND RELATED PORTABLE ELECTRONIC DEVICE COMBINATION

BACKGROUND

1. Technical Field

The present invention relates to a protective envelope, and particularly relates to a protective envelope for a portable electronic device and a related portable electronic device combination.

2. Discussion of Related Art

With the rapid development of electronic technologies, portable electronic devices, such as mobile telephones, digital cameras, and personal digital assistants (PDAs), are now in widespread use. These electronic devices enable consumers to enjoy high technology services almost anytime and anywhere, and usually equipped with protective envelopes configured for housing the portable electronic devices to make it convenient to carry and prevent from being damaged.

However, the portable electronic devices, such as mobile phones are easily contaminated by fingerprints and dusts to their displays and keyboards. Generally, the protective envelopes for mobile phones only have the function of housing the mobile phones, but do not have the function of cleaning the mobile phones.

Therefore, a new protective envelope for a portable electronic device is desired to overcome the shortcomings described above.

SUMMARY

An exemplary protective envelope for a portable electronic device includes a hollow main body and a cleaning roller arranged in the hollow main body. The hollow main body defines therein an opening for insertion of the portable electronic device therethrough. The cleaning roller is rotatably fixed in the hollow main body.

BRIEF DESCRIPTION OF THE DRAWINGS

Many aspects of the present protective envelope can be better understood with reference to the following drawings. The components in the drawings are not necessarily to scale, the emphasis instead being placed upon clearly illustrating the principles of the present protective envelope. Moreover, in the drawings, like reference numerals designate corresponding parts throughout the several views.

DETAILED DESCRIPTION OF EMBODIMENTS

Reference will now be made to the drawings to describe in detail of the exemplary embodiments of the protective envelope.

Figure 1:
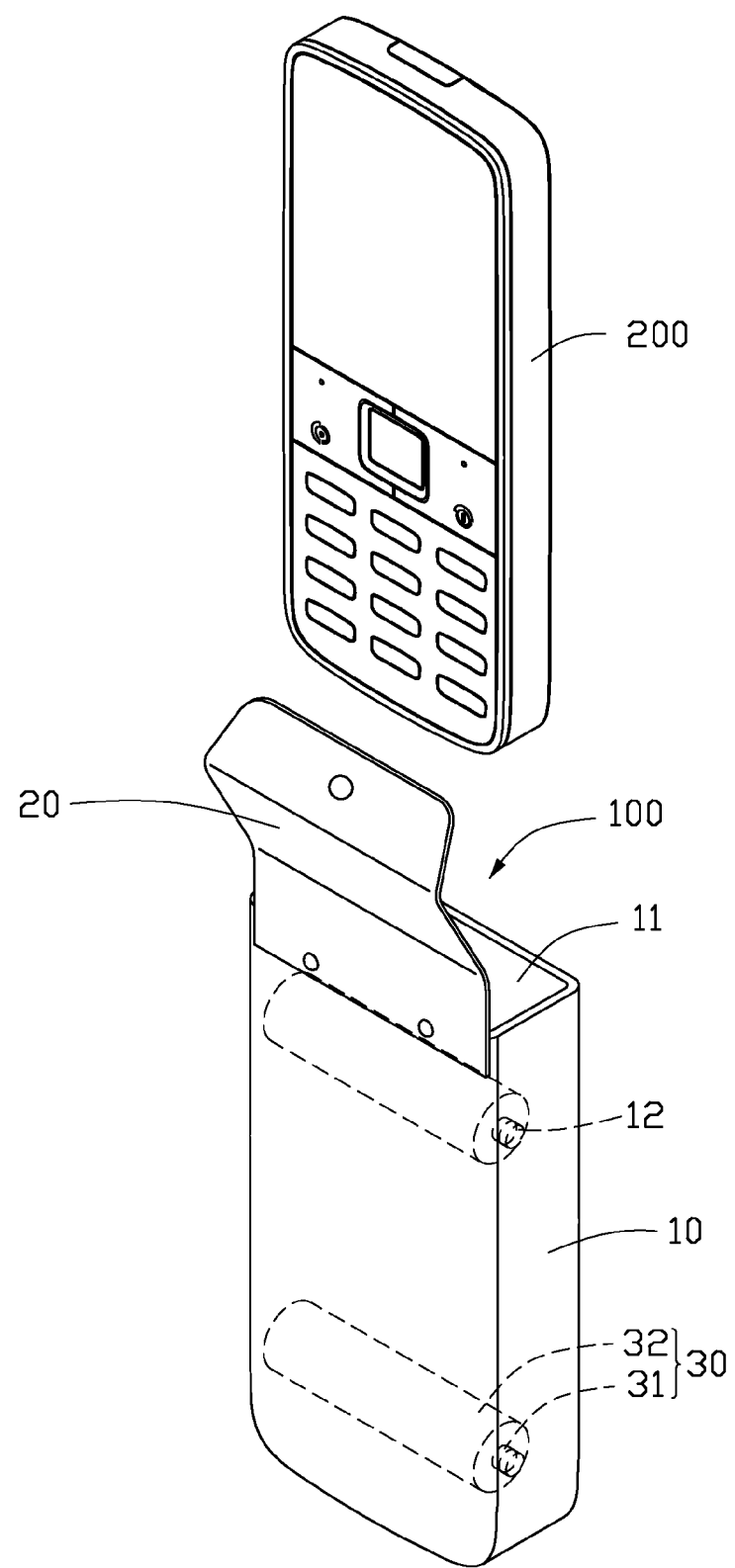
FIG. 1 is a schematic view of a protective envelope and a mobile phone in accordance with an exemplary embodiment.
Figure 2:
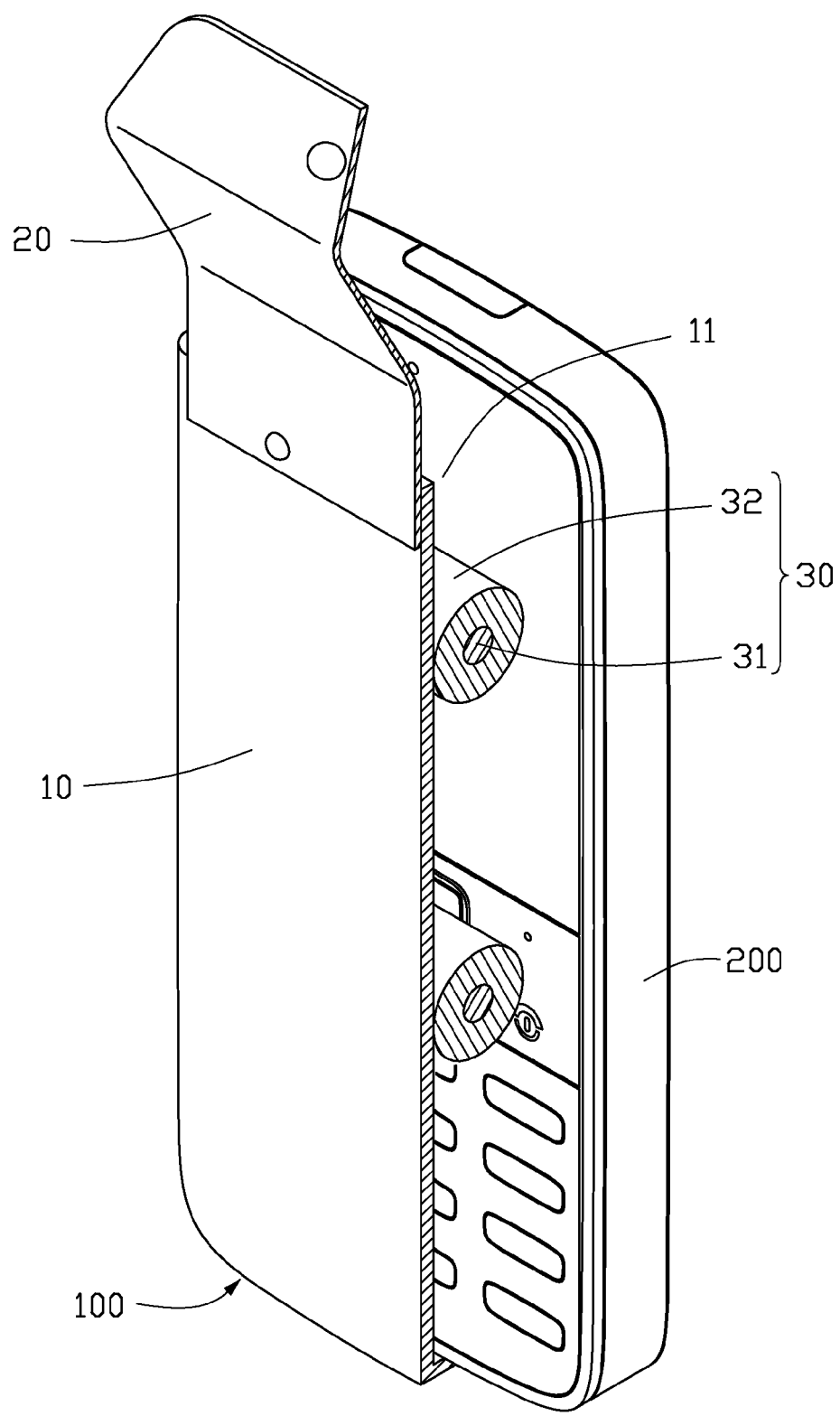
FIG. 2 is an assembled, schematic, cutaway view of the protective envelope and the mobile phone of FIG. 1.

Referring to FIGS. 1 and 2, a protective envelope 100 for receiving a portable electronic device 200, in accordance with an exemplary embodiment, includes a hollow main body 10 and two cleaning rollers 30 arranged in the hollow main body 10. In the present embodiment, the portable electronic device 200 is a mobile phone.

The hollow main body 10 defines an internal space conforming to the contour of the portable electronic device. In the present embodiment, the shape of the hollow main body 10 is cuboid and conforms to the shape of the portable electronic device 200 configured for fitly receiving the portable electronic device 200. The material of the hollow main body 10 may be leather, plastic or sacking. In the present embodiment, the hollow main body 10 is made of leather.

The hollow main body 10 has an opening 11 defined in one end of the hollow main body 10, configured for facilitating insertion of the portable electronic device 200 from the protective envelope 100 through the opening 11.

The cleaning rollers 30 are rotatably fixed in the hollow main body 10 by a shaft 31, and are capable of rotating around the shaft 31. The shaft 31 is fixed in the hollow main body 10 by two fixing holes 12 oppositely arranged in the inner sidewall of the hollow main body 10. The cleaning rollers 30 include an adhesive surface 32. The material of the adhesive surface 32 may be gummy materials, such as silica gel or butyl. The shape of the cleaning rollers 30 is columned. The axial direction of the cleaning rollers 30 is perpendicular to an insertion direction of the portable electronic device 200. When the portable electronic device 200 is put into or taken out from the hollow main body 10, the cleaning rollers 30 contact the surface of the portable electronic device 200 and roll with respect to the movement of the portable electronic device 200 to clean the surface of the portable electronic device 200.

It should be understood that the axial direction of the cleaning rollers 30 can be oriented obliquely relative to the insertion direction of the portable electronic device 200. However, the axial direction of the cleaning rollers 30 should not be parallel with the insertion direction of the portable electronic device 200.

The two cleaning rollers 30 are parallel with each other. The cleaning rollers 30 are arranged on at least one inner sidewall of the hollow main body 10. That is, the cleaning rollers 30 can be arranged on several inner sidewalls of the hollow main body 10, such as arranged on the opposite two inner sidewalls of the hollow main body 10. The number of the cleaning rollers 30 may be one or more than one. When the number of the cleaning rollers 30 is more than two, the array manner of them should not be limited by the manner of the present embodiment, and it can be arranged by practical need.

The protective envelope 100 further includes a cover 20. The cover 20 is arranged on an end of the opening 11, and is configured for covering the opening 11. The material of the cover 20 may be leather, plastic or sacking. In the present embodiment, the cover 20 is made of leather. The cover 20 may be agglutinated or sewed to the main body 10, or integrally formed with the main body 10.

The portable electronic device 200 is a mobile phone in the present embodiment, and it also can be other portable electronic device, such as a personal digital assistant (PDA) or a digital camera.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A protective envelope for a portable electronic device, comprising:

a hollow main body defining therein an opening for insertion of the portable electronic device therethrough; and a cleaning roller arranged in the hollow main body, the cleaning roller being rotatably fixed in the hollow main body, wherein the cleaning roller includes an adhesive surface.

2. The protective envelope of claim 1, wherein an axial direction of the cleaning roller is perpendicular to an insertion direction of the portable electronic device.

3. The protective envelope of claim 1, wherein an axial direction of the cleaning roller is oriented obliquely relative to the insertion direction of the portable electronic.

4. The protective envelope of claim 1, wherein the cleaning roller includes a shaft fixed to the hollow main body.

5. A portable electronic device combination comprising:
a portable electronic device; and
a protective envelope for receiving the portable electronic device therein, comprising:
a hollow main body defining therein an opening for insertion of the portable electronic device therethrough in the hollow main body; and
a cleaning roller arranged in the hollow main body, the cleaning roller being rotatably fixed in the hollow main body, wherein the cleaning roller includes an adhesive surface.

6. The portable electronic device combination of claim 5, wherein an axial direction of the cleaning roller is perpendicular to an insertion direction of the portable electronic device.

7. The portable electronic device combination of claim 5, wherein an axial direction of the cleaning roller is oriented obliquely relative to the insertion direction of the portable electronic device.

8. The portable electronic device combination of claim 5, wherein the cleaning roller includes a shaft fixed to the hollow main body.

9. The portable electronic device combination of claim 5, wherein the hollow main body defines an internal space conforming to that the contour of the portable electronic device.

* * * * *